United States Patent
Gamou

(10) Patent No.: US 7,343,143 B2
(45) Date of Patent: Mar. 11, 2008

(54) RADIO RECEIVER WITH OPERATION STATE SETTING UNIT

(75) Inventor: Yoshitsugu Gamou, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 450 days.

(21) Appl. No.: 10/862,903

(22) Filed: Jun. 7, 2004

(65) Prior Publication Data

US 2005/0020220 A1    Jan. 27, 2005

(30) Foreign Application Priority Data

Jun. 10, 2003   (JP)   .............................. 2003-164503

(51) Int. Cl.
*H04B 17/00* (2006.01)
(52) U.S. Cl. ................... 455/226.1; 455/296; 455/268; 375/346
(58) Field of Classification Search ................ 455/296, 455/303, 304, 305, 306, 307, 334, 337, 226.1; 375/346–350
See application file for complete search history.

(56) References Cited

U.S. PATENT DOCUMENTS

| 5,369,470 | A | * | 11/1994 | Hansen | ........................ 455/296 |
| 5,379,449 | A | * | 1/1995 | Porambo | ..................... 455/506 |
| 5,493,717 | A | * | 2/1996 | Schwarz | ...................... 455/306 |
| 5,631,963 | A | * | 5/1997 | Herrmann | ..................... 381/13 |
| 6,064,865 | A | * | 5/2000 | Kuo et al. | ................... 455/135 |
| 6,178,211 | B1 | * | 1/2001 | Whikehart et al. | ......... 375/350 |
| 6,178,314 | B1 | * | 1/2001 | Whikehart et al. | ...... 455/188.1 |
| 6,178,317 | B1 | | 1/2001 | Kroeger et al. | |
| 6,603,826 | B1 | | 8/2003 | Cupo et al. | |
| 6,658,245 | B2 | * | 12/2003 | Li et al. | ...................... 455/307 |
| 6,671,340 | B1 | * | 12/2003 | Kroeger et al. | ............. 375/350 |
| 6,741,844 | B2 | * | 5/2004 | Medvid et al. | .......... 455/232.1 |
| 6,901,243 | B2 | * | 5/2005 | Jayaraman et al. | ........ 455/63.1 |
| 6,931,081 | B2 | * | 8/2005 | Meijer et al. | ............... 375/316 |
| 6,937,871 | B2 | * | 8/2005 | Dick | ........................... 455/501 |
| 7,106,809 | B2 | * | 9/2006 | Whikehart et al. | ......... 375/316 |
| 2004/0213366 | A1 | * | 10/2004 | Ono | ............................ 375/348 |

\* cited by examiner

*Primary Examiner*—Blane J. Jackson
(74) *Attorney, Agent, or Firm*—Brinks Hofer Gilson & Lione

(57) ABSTRACT

There is provided a radio receiver which can set a proper receive state regardless of the existence of an adjacent station. If an adjacent station detection circuit detects an IBOC station having a carrier frequency adjacent to a receive frequency, a control unit transmits instructions to a stereo demodulation circuit, a soft mute circuit, and the like to change control states of input/output characteristics such as a channel separation characteristic, a blend characteristic, a high-cut characteristic, and a soft mute characteristic. The control unit also transmits instructions to a multi-path detection circuit and an adjacent interference detection circuit to change thresholds used for detecting multi-path interference and adjacent interference.

18 Claims, 9 Drawing Sheets

RADIO RECEIVER WITH OPERATION STATE SETTING UNIT

BACKGROUND OF THE INVENTION

1. Field of the Invention

The present relates to a radio receiver receiving an analog broadcast signal and a digital broadcast signal, both having the same broadcast contents, and carrying out a reproduction operation for these signals.

2. Description of the Related Art

Conventionally, there has been known a radio receiver which receives an analog broadcast signal and a digital broadcast signal contained in the same frequency band, and carrying out reproduction operations appropriate for the respective broadcast signals in parallel (for example, see PCT International Application No. 2001-520479). This radio receiver receives, for example, a main broadcast signal of digital modulated signals, and a redundant signal of an analog FM modulated signal whose contents are the same as those of the main broadcast signal delayed by a predetermined time, and the reproduction operation is carried out using the redundant signal if the main broadcast signals are damaged, or the main broadcast signals are not received. As a result, it is possible to properly reproduce a broadcast program even if the reception of the main broadcast signal is interrupted.

In the radio receiver disclosed in the above patent publication, the digital broadcast signals are arranged in side-bands of the analog FM broadcast signal, and thus, a wider frequency band is necessary compared with a case where only the analog FM broadcast signal is received. For example, while the frequency band is set to 150 kHz if only the analog FM broadcast signal is received, the frequency band is set to 500 kHz if both the analog FM broadcast signal and the digital broadcast signals are received.

In present analog FM broadcast in the United States, the receive frequencies are assigned at an interval of 200 kHz, and thus, if a broadcast station (adjacent station) transmitting a broadcast signal with a wide frequency band including an analog FM broadcast signal and digital broadcast signals exists at a frequency adjacent to a receive frequency (frequency within ±200 kHz of the receive frequency), the noise floor in the receive frequency increases due to the digital broadcast signals contained in the side-bands. An ordinary receiver includes an S meter for detecting a receive electric field strength of a broadcast signal, and carries out various types of control operations (such as high-cut processing, and soft mute processing) based on this detected signal, and thus, there is the problem that if the level of the signal detected by the S meter changes depending on the existence of an adjacent station broadcasting a signal including digital broadcast signals in side-bands, various types of control operations are not carried out normally, and consequently, a proper operation state cannot be attained.

SUMMARY OF THE INVENTION

The present invention is devised in view of the foregoing problems, and has an object of providing a radio receiver realizing a proper operation state regardless of the existence of an adjacent station.

To solve the above-described problems, a radio receiver according to the present invention comprises an adjacent station detection unit for detecting the existence of an adjacent station transmitting a broadcast signal at a frequency adjacent to a predetermined receive frequency, a broadcast signal reception unit for receiving a broadcast signal at the receive frequency and producing the content of the broadcast signal, and an operation state setting unit for setting an operation state of the broadcast signal reception unit based on the detection result by the adjacent station detection unit. Consequently, the different operation states can be set depending on the existence of an adjacent station, and thus, a proper receive state is realized regardless of the existence of the adjacent station.

Preferably, the radio receiver further comprises a receive state detection unit for detecting a receive state of a broadcast signal to be received, and the operation state setting unit sets an operation state of the broadcast signal reception unit based on the receive state detected by the receive state detection unit. Preferably, the above-described receive state detected by the receive state detection unit is a receive electric field strength of the broadcast signal. Consequently, it is possible to realize a proper operation state according to the receive state of the broadcast signal, especially the receive electric filed strength, while considering the existence of an adjacent station.

Preferably, the above-described adjacent station includes a first adjacent station transmitting a broadcast signal whose one channel contains a first carrier signal corresponding to an analog broadcast signal, and a second carrier signal corresponding to a digital broadcast signal including the same broadcast content as that of the analog broadcast signal, and a second adjacent station transmitting a broadcast signal whose one channel contains only the first carrier signal, and the adjacent station detection unit detects the existence of the first adjacent station. Consequently, even if the entire noise floor increases due to the second carrier signal, a proper operation state can be always realized.

Preferably, the above-described broadcast signal reception unit uses the analog broadcast signal to carry out a reproduction operation of the content of the analog broadcast signal. Consequently, even if the noise floor of the analog broadcast signal to be received increases due to the second carrier signal transmitted by the first adjacent station, a proper operation state can be realized.

Preferably, the above-described broadcast signal reception unit includes a tuner unit for converting a broadcast signal to be received to an intermediate frequency signal, and the adjacent station detection unit includes a first filter for extracting a beat component of the second carrier signal contained in the intermediate frequency signal, and a first determination unit for determining the existence of the first adjacent station by carrying out level detection of a frequency component having passed the first filter. Consequently, it is possible to selectively extract only an adjacent station corresponding to a broadcast signal whose channel includes a digital broadcast signal in addition to an analog broadcast signal.

Preferably, the above-described broadcast signal reception unit includes a stereo demodulation circuit carrying out stereo demodulation processing after detection of a broadcast signal corresponding to analog FM modulation, and the operation state setting unit sets a channel separation characteristic in the stereo demodulation processing in the stereo demodulation circuit based on the receive state detected by the receive state detection unit. Preferably, the above-described broadcast signal reception unit includes a stereo demodulation circuit carrying out stereo demodulation processing after detection of a broadcast signal corresponding to analog FM modulation, and the operation state setting unit sets a blend characteristic in the stereo demodulation processing in the stereo demodulation circuit based on the receive state detected by the receive state detection unit.

Preferably, the above-described broadcast signal reception unit includes a stereo demodulation circuit carrying out stereo demodulation processing after detection of a broadcast signal corresponding to analog FM modulation, and the operation state setting unit sets a high-cut characteristic of removing a high frequency component in the stereo demodulation processing in the stereo demodulation circuit based on the receive state detected by the receive state detection unit. Preferably, the above-described broadcast signal reception unit includes a mute circuit which attenuates an output level after detection of a broadcast signal corresponding to analog modulation, and the operation state setting unit sets the attenuation quantity of the output level in the mute circuit based on the receive state detected by the receive state detection unit. In this way, it is possible to realize a proper operation state according to the receive state of the broadcast signal by setting the channel separation characteristic, the blend characteristic, the high-cut characteristic, and the mute characteristic according to the existence of an adjacent station.

Preferably, the radio receiver further comprises a multi-path detection circuit for detecting generation of multi-path interference at a receive frequency, and the operation state setting unit variably sets a threshold used for determining the generation of the multi-path interference based on the detection result by the adjacent station detection unit. Consequently, it is possible to properly detect multi-path interference regardless of the existence of an adjacent station even if the capability of detecting multi-path interference changes according to the existence of an adjacent station.

Preferably, the above-described broadcast signal reception unit includes a tuner unit for converting a broadcast signal to be received to an intermediate frequency signal, the multi-path detection circuit includes a second filter for extracting a specific frequency component which is contained in the intermediate frequency signal, and increases when the multi-path interference is generated, and a second determination unit for determining generation of the multi-path interference by carrying out level detection of the specific frequency component having passed the second filter, and the operation state setting unit variably sets the threshold used for the determination by the second determination unit based on the detection result by the adjacent station detection unit. Consequently, it is possible to surely detect generation of multi-path interference regardless of the existence of an adjacent station.

Preferably, the above-described broadcast signal reception unit includes a stereo demodulation circuit carrying out stereo demodulation processing after detection of a broadcast signal corresponding to analog FM modulation, and the operation state setting unit sets the stereo demodulation circuit to carry out monaural reproduction when the multi-path detection circuit detects generation of multi-path. Consequently, it is possible to detect generation of multi-path regardless of the existence of an adjacent station, thereby realizing a proper operation state.

Preferably, the radio receiver further comprises an adjacent interference detection circuit for detecting generation of adjacent interference at a receive frequency, and the operation state setting unit variably sets a threshold used for determining the generation of the adjacent interference based on the detection result by the adjacent station detection unit. Consequently, it is possible to maintain the capability of detecting adjacent interference even if an adjacent station is present, and thus to properly detect the adjacent interference regardless of the existence of an adjacent station.

Preferably, the above-described broadcast signal reception unit includes a tuner unit for converting a broadcast signal to be received to an intermediate frequency signal, the adjacent interference detection circuit includes a third filter for extracting a beat component at a specific frequency which is contained in the intermediate frequency signal, and increases when the adjacent interference is generated, and a third determination unit for determining the generation of the adjacent interference by carrying out level detection of the beat component at the specific frequency having passed the third filter, and the operation state setting unit variably sets the threshold used for the determination by the third determination unit based on the detection result by the adjacent station detection unit. Consequently, it is possible to properly detect the adjacent interference in a case where an adjacent station exists, and in a case where an adjacent station does not exit.

Preferably, the above-described broadcast signal reception unit includes a band pass filter which passes only a predetermined band component of the intermediate frequency signal output from the tuner unit, and the operation state setting unit narrows the band of the band pass filter when the adjacent interference detection circuit detects generation of the adjacent interference. Consequently, it is possible to detect generation of adjacent interference regardless of the existence of an adjacent station, thereby realizing a proper operation state.

DESCRIPTION OF THE PREFERRED EMBODIMENTS

A detailed description will now be given of a radio receiver according to an embodiment to which the present invention is applied, with reference to the drawings.

Figure 1:
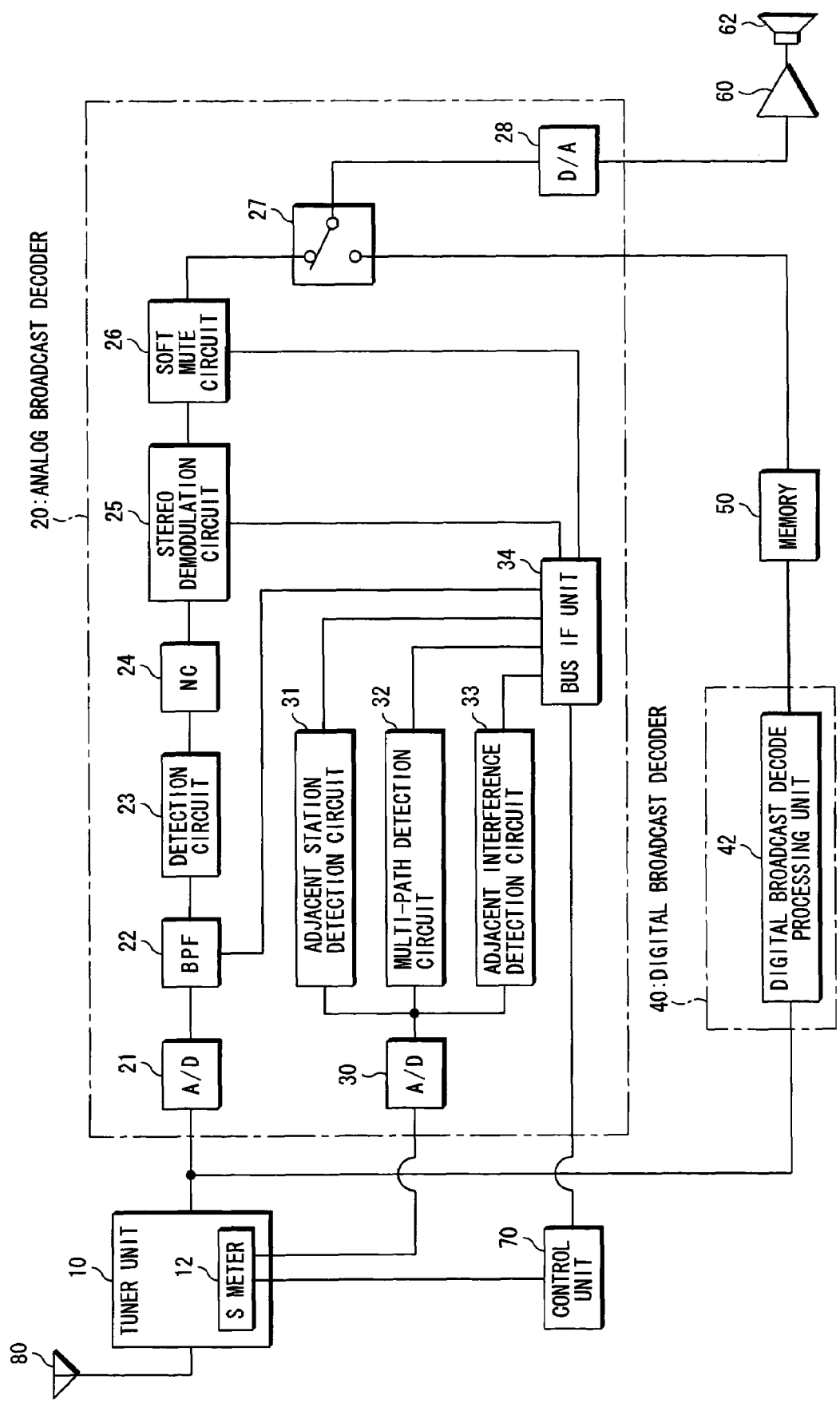
FIG. 1 shows the configuration of a radio receiver according to an embodiment.

FIG. 1 shows the configuration of the radio receiver according to the embodiment. The radio receiver shown in FIG. 1 includes a tuner unit 10, an analog broadcast decoder 20, a digital broadcast decoder 40, a memory 50, an amplifier 60, a speaker 62, and a control unit 70. This radio receiver is applied to an FM in-band on-channel broadcast system (IBOC broadcast system) for transmitting/receiving a broadcast signal having a modulation format for FM in-band on-channel (IBOC) digital audio broadcast (DAB).

The tuner unit 10 extracts only a predetermined frequency component from various types of broadcast signals reaching the antenna 80, converts the component to an IF (intermediate frequency) signal having a predetermined frequency band, and produces the IF signal. For example, the tuner unit 10 includes a high-frequency amplifier, a mixer circuit, a local oscillator, an IF amplifier, an IF filter, and the like, extracts only the predetermined frequency component to be received from the broadcast signals, and produces the IF signal to which the frequency conversion has been applied.

The tuner unit 10 includes an S meter (signal meter) 12 for detecting a receive electric field strength (receive state) of the broadcast signal corresponding to the IF signal. The S meter 12 carries out AM detection by passing the IF signal through an LPF (low pass filter), for example, thereby outputting an S meter signal having a voltage level corresponding to the receive electric filed strength. The S meter 12 also outputs a signal containing an AC component of the IF signal before passing the LPF, and this signal is sent to the analog broadcast decoder 20.

Figure 2:
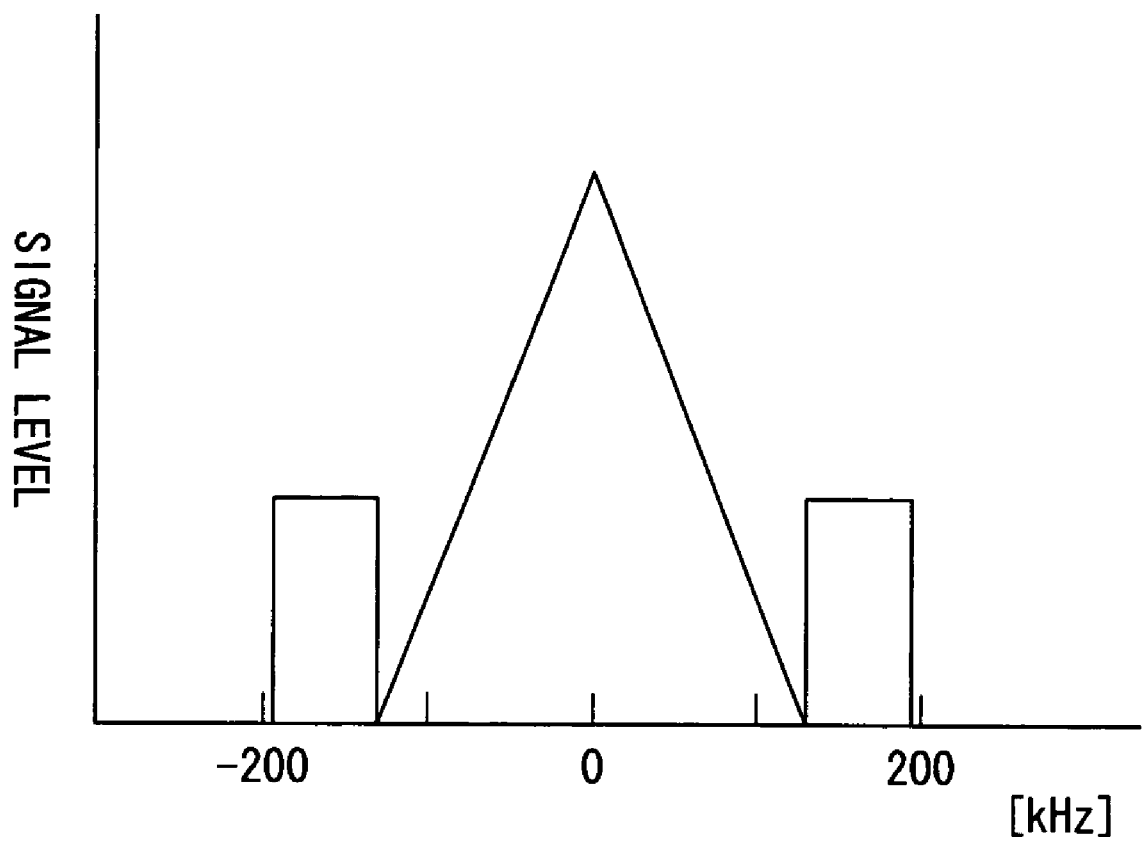
FIG. 2 shows a frequency assignment of a broadcast signal used for an IBOC broadcast system.

FIG. 2 shows a frequency assignment of the broadcast signal used for the IBOC broadcast system, and indicates an output spectral density corresponding to one broadcast channel provided as an output from the tuner unit 10. The horizontal axis of FIG. 2 shows the frequency of the broadcast signal while the center frequency of the IF signal is 0 (zero). As FIG. 2 shows, the broadcast signal according to the present embodiment includes an analog FM broadcast signal as a signal component (first carrier signal) whose spectral density decreases at a predetermined slope as the frequency is displaced from the center frequency, and digital broadcast signals as signal components (second carrier signals) arranged on both sides of the analog FM broadcast signal, namely disposed as an upper side-band and a lower side-band.

The analog FM broadcast signal is a broadcast signal generated by applying FM modulation (frequency modulation) to an audio signal. The digital broadcast signal is a broadcast signal generated by applying digital modulation to an audio signal. Though the analog FM broadcast signal and digital broadcast signals are generated by applying the modulation to the same audio signal, a broadcast station transmits the analog FM broadcast signal after a predetermined delay (such as about four seconds), and consequently, the analog FM broadcast signal is received after this delay with respect to the digital broadcast signal having the same contents.

The analog broadcast decoder 20 carries out predetermined demodulation processing, thereby reproducing the audio data based on the analog FM broadcast signal contained in the IF signal received from the tuner unit 10. The digital broadcast decoder 40 carries out predetermined demodulation processing, thereby reproducing audio data based on the digital broadcast signal contained in the IF signal received from the tuner unit 10. The demodulated audio data from the digital broadcast decoder 40 are accumulated in the memory 50, and then are provided to the analog broadcast decoder 20.

In the present embodiment, the analog broadcast decoder 20 has a function to switch between the audio data reproduced using the analog broadcast decoder 20 itself and the audio data reproduced using the digital broadcast decoder 40. The digital audio data are usually selected, and the analog audio data are selected instead if the digital audio data cannot be selected. For this switching, the audio data output from the digital broadcast decoder 40 are provided to the analog broadcast decoder 20 after being accumulated in the memory 50.

The digital broadcast decoder 40 is provided with a digital broadcast decode processing unit 42. The digital broadcast decode processing unit 42 extracts the digital broadcast signal contained in the input IF signal, applies predetermined digital demodulation to the digital broadcast signal, and produces the audio data.

Figure 3:
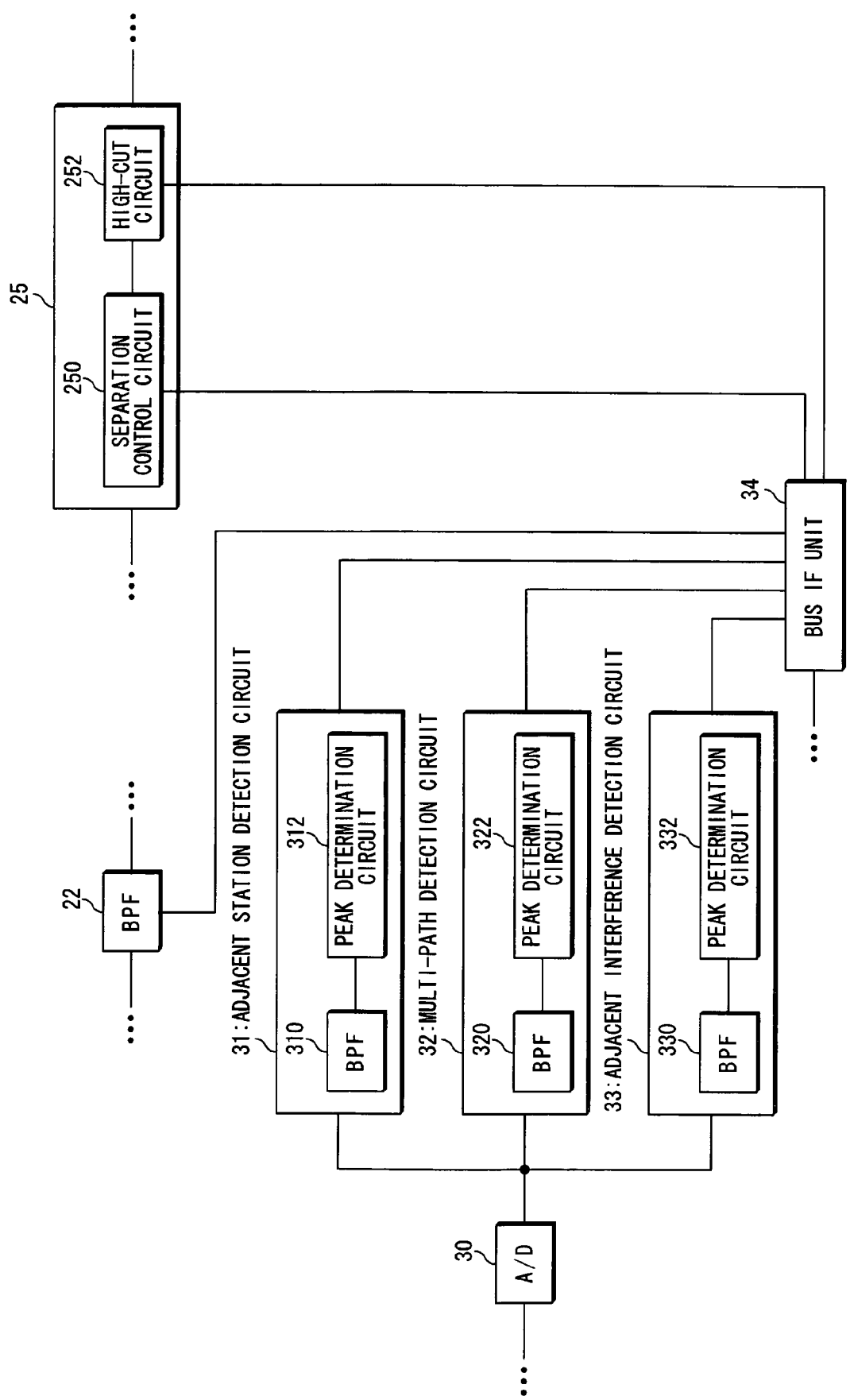
FIG. 3 shows a more detailed construction of part of the circuits in an analog broadcast decoder.

FIG. 3 shows a detailed construction of part of the circuits in the analog broadcast decoder 20.

As FIG. 1 and FIG. 3 show, the analog broadcast decoder 20 is provided with an analog-digital (A/D) converter 21, a band pass filter (BPF) 22, a detection circuit 23, a noise canceller (NC) 24, a stereo demodulation circuit 25, a soft mute circuit 26, a switch 27, and a digital-analog (D/A) converter 28.

The analog-digital converter 21 samples the IF signal received from the tuner unit 10 at a predetermined frequency, thereby converting the IF signal to digital data (IF data). The band pass filter 22 extracts a component contained in a predetermined band with respect to the center frequency (such as 10.7 MHz) of the IF data. In the present embodiment, two types of bands (a narrow band and a wide band) can be selectively set. The detection circuit 23 applies predetermined FM detection processing to the IF data having passed the band pass filter 22. The noise canceller 24 removes a noise component contained in the stereo composite data after the FM detection.

A stereo demodulation circuit 25 carries out processing for separating L data and R data contained in the stereo composite data. This stereo demodulation circuit 25 includes a separation control circuit 250 and a high-cut circuit 252. The separation control circuit 250 carries out blend processing which blends the L data and the R data if the receive electric field strength decreases, and processing for changing the stereo reproduction to monaural reproduction when the receive electric field strength decreases further. The high-cut circuit 252 carries out high-cut processing which removes a high frequency component if the receive electric filed strength further decreases, and a noise component increases at a high frequency. The soft mute circuit 26 carries out soft mute processing which attenuates the output level if the receive electric field strength still further decreases, and the noise component increases.

The switch 27 selects either the audio data which are reproduced by the analog reproduction and then received from the soft mute circuit 26, or the audio data which are reproduced by the digital reproduction and received from the memory 50, and provides as an output the selected audio data. Though the switch 27 usually selects and provides the audio data reproduced by the digital reproduction, the switch 27 selects and provides the audio data reproduced by the analog reproduction if the digital reproduction is temporarily unavailable, or if the receive electric field strength extremely decreases, bit error thereby increases above a predetermined value, and the digital reproduction becomes difficult as a result. The digital-analog converter 28 converts the audio data from the switch 27 to an analog audio signal, and produces the analog audio signal.

The analog broadcast decoder 20 is provided with an analog-digital converter (A/D) 30, an adjacent station detection circuit 31, a multi-path detection circuit 32, an adjacent interference detection circuit 33, and a bus IF (interface) unit 34.

The analog-digital converter 30 samples a signal received from the S meter 12 in the tuner unit 10 before passing the LPF at a predetermined frequency, thereby converting the signal into digital data (electric field strength data).

The adjacent station detection circuit 31 detects the existence of a broadcast station prepared for the IBOC broadcast system which has a carrier frequency separated from the receive frequency by 200 kHz (this broadcast station is referred to as "IBOC station" hereinafter). For example, in the present embodiment, it is assumed that the frequency assignment interval is 200 kHz for IBOC stations, and the frequency assignment interval is 100 kHz for other broadcast stations which transmit only an analog FM broadcast signal.

As FIG. 3 shows, the adjacent station detection circuit 31 includes a band pass filter (BPF) 310 and a peak determination circuit 312. A broadcast signal transmitted from the respective IBOC station includes a frequency component corresponding to an analog FM broadcast signal and frequency components corresponding to digital broadcast signals arranged in side-bands of the analog FM broadcast signal as shown in FIG. 2. Thus, if there is an IBOC station separated by 200 kHz from the receive frequency, the AC component of the signal received from the S meter 12 contains beat components generated by the digital broadcast signals. The band pass filter 310 extracts this beat component. The peak determination circuit 312 detects a peak value of the beat component extracted by the band pass filter 310, and produces detection data indicating that an adjacent station exists, and simultaneously, this adjacent station is an IBOC station when the peak value exceeds a predetermined level.

The multi-path detection circuit 32 detects generation of multi-path interference. As FIG. 3 shows, the multi-path detection circuit 32 includes a band pass filter (BPF) 320 and a peak determination circuit 322. Noise due to the multi-path interference is generated during the stereo demodulation, and hence it is possible to determine generation of the multi-path interference by detecting a high frequency distortion component of a pilot signal at 19 kHz contained in the stereo composite data. The band pass filter 320 extracts a component, for example, in a neighborhood of 114 kHz (=19 kHz×6) as the high frequency distortion component of the pilot signal. The peak determination circuit 322 detects a peak value in the neighborhood of 114 kHz extracted by the band pass filter 320, and produces detection data indicating that multi-path interference is generated if the peak value exceeds a predetermined threshold.

The adjacent interference detection circuit 33 detects the generation of adjacent interference due to an adjacent station transmitting a signal at a carrier frequency separated by 100 kHz from the receive frequency. As FIG. 3 shows, the adjacent interference detection circuit 33 includes a band pass filter (BPF) 330 and a peak determination circuit 332. When there exists an adjacent station separated by 100 kHz from the receive frequency, the AC component of the signal received from the S meter 12 contains a beat component at 100 kHz. The band pass filter 330 extracts this beat component at 100 kHz. The peak determination circuit 332 detects a peak value of the beat component at 100 kHz extracted by the band pass filter 330, and generates detection data indicating that adjacent interference is generated if the peak value exceeds a predetermined level.

The bus IF unit 34 carries out processing for transmitting/receiving data in a predetermined format to/from the control unit 70 through a bus. For example, in the present embodiment, the control unit 70 is connected to the tuner unit 10, the analog broadcast decoder 20, and the digital broadcast decoder 40 thorough an IIC bus proposed by Philips, and data in formats compliant to the IIC bus are transmitted/received.

The amplifier 60 shown in FIG. 1 amplifies the audio signal received from the digital-analog converter 28 in the analog broadcast decoder 20, thereby driving a speaker 62. Though FIG. 1 shows the one speaker 62, two or more speakers are actually provided for the stereo audio signal.

The control unit 70 controls the entire radio receiver. For example, if a user uses an operation unit (not shown) to carry out different types of instruction operations, the control unit 70 carries out a control operation according to what is instructed by the operation of the user. As a result, a tuning operation which tunes the receive frequency to a frequency assigned to a desired broadcast station, or an operation for adjusting sound volume or tone can be carried out. In the present embodiment, the control unit 70 changes the setting of an FM input/output characteristic, a multi-path characteristic, and an adjacent interference characteristic respectively depending on the existence of the IBOC station as the adjacent station. A detailed description will be given of the change of the setting later.

The above-described adjacent station detection circuit 31 corresponds to an adjacent station detection unit; the tuner unit 10, the analog-digital converter 21, the band pass filter 22, the detection circuit 23, the noise canceller 24, the stereo demodulation circuit 25, and the soft mute circuit 26 correspond to a broadcast signal reception unit; the control unit 70 corresponds to an operation state setting unit; and the S meter 12 corresponds to a receive state detection unit, respectively. Additionally, the analog FM broadcast signal corresponds to a first carrier signal, the digital broadcast signal corresponds to a second carrier signal, an IBOC station as the adjacent station corresponds to a first adjacent station, and an adjacent station other than an IBOC station corresponds to a second adjacent station. The band pass filter 310 corresponds to a first filter, the peak determination circuit 312 corresponds to a first determination unit, the band pass filter 320 corresponds to a second filter, the peak determination circuit 322 corresponds to a second determination unit, the band pass filter 330 corresponds to a third filter, and the peak determination circuit 332 corresponds to a third determination unit, respectively.

The radio receiver according to the present embodiment has the above-described construction, and a description will now be given of the operation.

(1) Operation if No IBOC Station Exists as an Adjacent Station

A description will now be given of an operation in which the control unit 70 sets a predetermined receive frequency, and there exists no IBOC station which transmits a broadcast signal having a carrier frequency higher or lower than the receive frequency by 200 kHz.

(1-1) Control of Input/Output Characteristics

As described above, the adjacent station detection circuit 31 in the analog broadcast decoder 20 extracts the beat component at the specific frequency in the AC component of the signal received from the S meter 12, and if the peak value of the beat component exceeds the predetermined level, the adjacent station detection circuit 31 detects an IBOC station as an adjacent station, and generates detection data indicating the existence of the IBOC station. The control unit 70 receives the detection data through the bus IF unit 34, and if the detection data is not provided, the control unit 70 determines that no IBOC station exists as an adjacent station, and controls input/output characteristics as described below.

Figure 4:
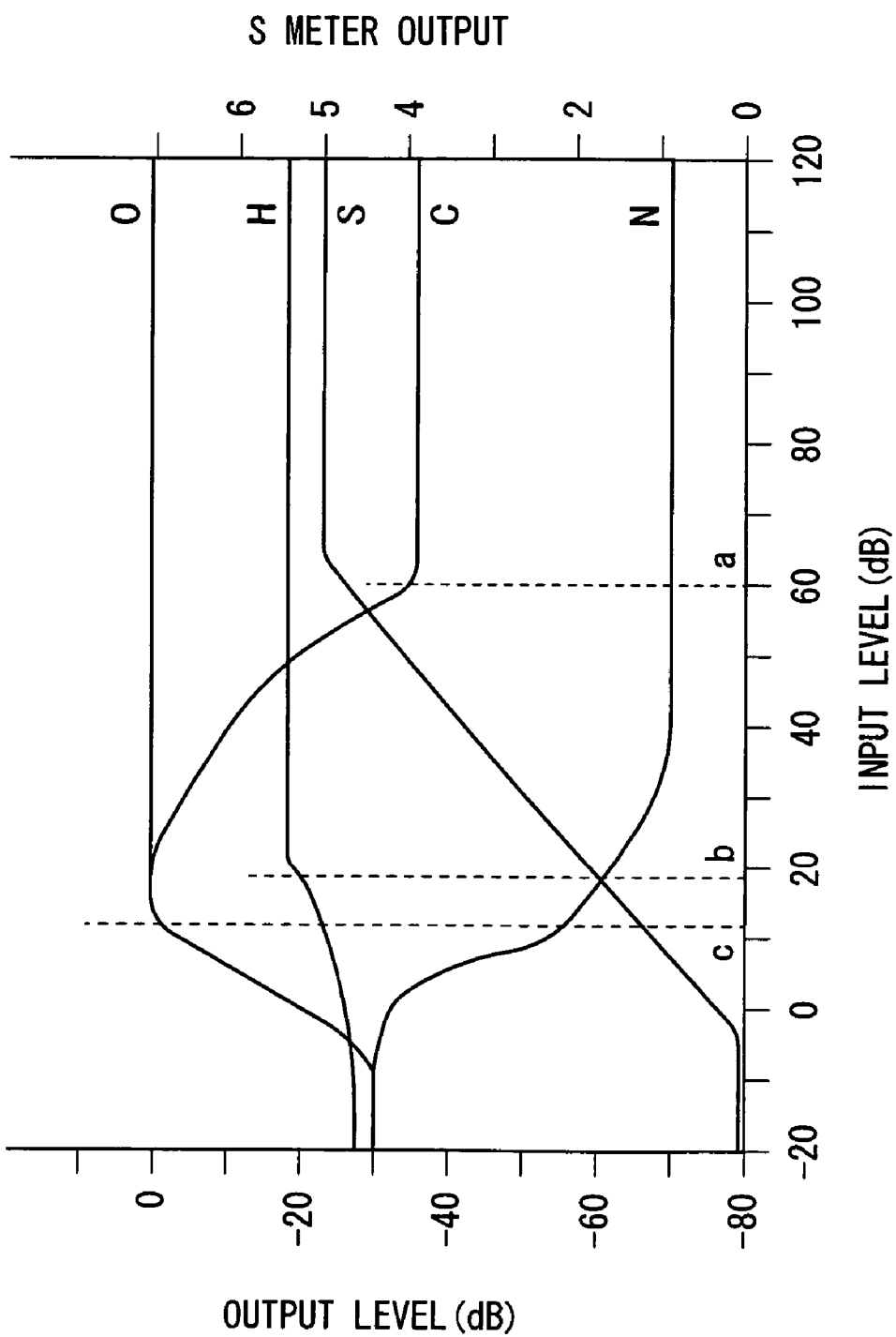
FIG. 4 shows states of input/output characteristics if no IBOC station exists as an adjacent station.

FIG. 4 shows states of the input/output characteristics if no IBOC station exists as an adjacent station. In FIG. 4, the horizontal axis is an input level indicating reception sensitivity, and the vertical axis (on the left side) is an audio output level. This figure also shows a relationship between the voltage level of the S meter signal (S meter output) produced by the S meter 12 (characteristic S) and the receive electric field strength, and the vertical axis on the right side indicates the voltage level of the S meter signal. A characteristic O indicates an output audio signal characteristic curve, a characteristic N indicates an output noise characteristic curve, a characteristic C indicates a channel separation characteristic curve, and a characteristic H indicates a high-cut characteristic curve, respectively.

The voltage level of the S meter signal indicated by the characteristic S maintains an approximately constant value in a state where the receive electric field strength of the broadcast signal is proper, and approximately linearly decreases if the receive electric field strength degrades from this state. The control unit 70 can recognize the receive electric field strength of the broadcast signal by detecting the voltage level of the S meter signal.

The input/output characteristics controlled by the control unit 70 include four types of characteristics, namely, the channel separation characteristic, the blend characteristic, the high-cut characteristic, and the soft mute characteristic.

The control unit 70 detects the receive electric field strength of the broadcast signal based on the voltage level of the S meter signal, and if the receive electric field strength is equal to or more than a reference value "a", the control unit 70 transmits an instruction to the separation control circuit 250 in the stereo demodulation circuit 25 through the bus IF unit 34 so that the channel separation characteristic is set to a constant value indicated by the characteristic C.

If the receive electric field strength is less than the reference value "a", the control unit 70 decreases the channel separation at the predetermined rate indicated by characteristic C (such as a rate decreasing the channel separation by 11 dB if the receive electric field strength decreases by 40 dB).

If the receive electric field strength is less than a reference value "b", the control unit 70 transmits an instruction to the high-cut circuit 252 in the stereo demodulation circuit 25 to carry out a setting such that the high frequency component of the audio signal is gradually removed so that the relationship indicated by the characteristic H is satisfied.

Further, if the receive electric filed strength is less than a reference value "c", the control unit 70 transmits an instruction to the soft mute circuit 26 through the bus IF unit 34 to carry out soft mute processing which gradually decreases the output level so that the relationship indicated by the characteristic 0 is satisfied.

(1-2) Control of Multi-path Characteristics

Figure 5:
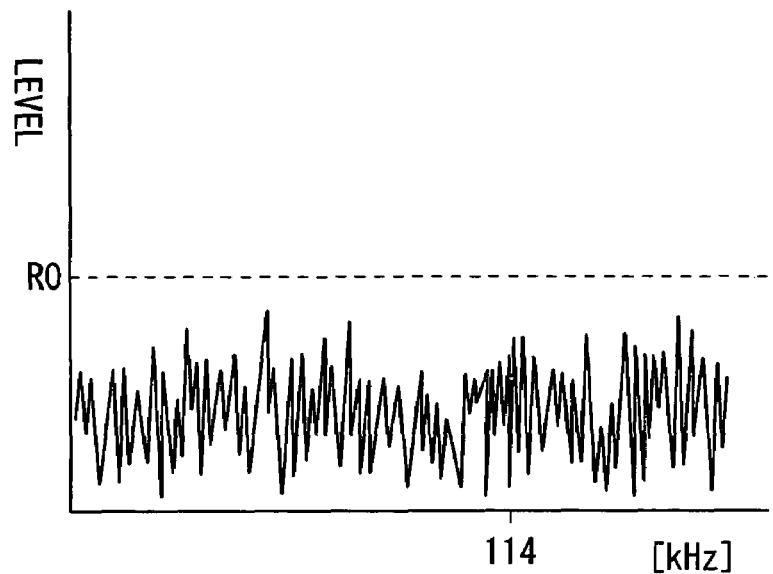
FIG. 5 shows an AC component of a signal provided from an S meter if no IBOC station exists as an adjacent station, and no multi-path interference is generated.
Figure 6:
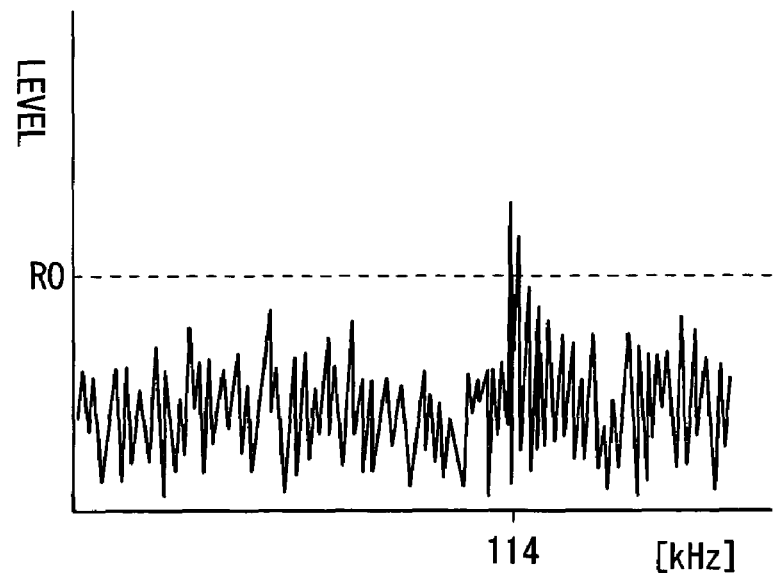
FIG. 6 shows the AC component of the signal provided from the S meter if no IBOC station exists as an adjacent station, and multi-path interference is generated.

FIG. 5 shows the AC component of the signal produced by the S meter 12 if no IBOC station exists as an adjacent station, and no multi-path interference is generated. FIG. 6 shows the AC component of the signal produced by the S meter 12 if no IBOC station exists as an adjacent station, and multi-path interference is generated.

If no IBOC station exists as an adjacent station, the control unit 70 transmits an instruction to the peak determination circuit 322 in the multi-path detection circuit 32 through the bus IF unit 34, and sets a threshold R0 used for detecting multi-path interference. Subsequently, the peak determination circuit 322 detects a peak value of a component in a neighborhood of 114 kHz in the output signal of the S meter 12 extracted by the band pass filter 320, and if the peak value exceeds the threshold R0 as FIG. 6 shows, the peak determination circuit 322 produces detection data indicating that multi-path interference is generated. The detection data are transmitted to the control unit 70 through the bus IF unit 34.

If the control unit 70 receives the detection data indicating the generation of multi-path interference transmitted from the multi-path detection circuit 32, the control unit 70 transmits an instruction for changing the stereo reproduction operation to the monaural reproduction operation to the separation control circuit 250 in the stereo demodulation circuit 25 through the bus IF unit 34. Subsequently, the stereo demodulation circuit 25 carries out the monaural reproduction processing so as to reduce multi-path interference noise.

(1-3) Control of Adjacent Interference Characteristic

Figure 7:
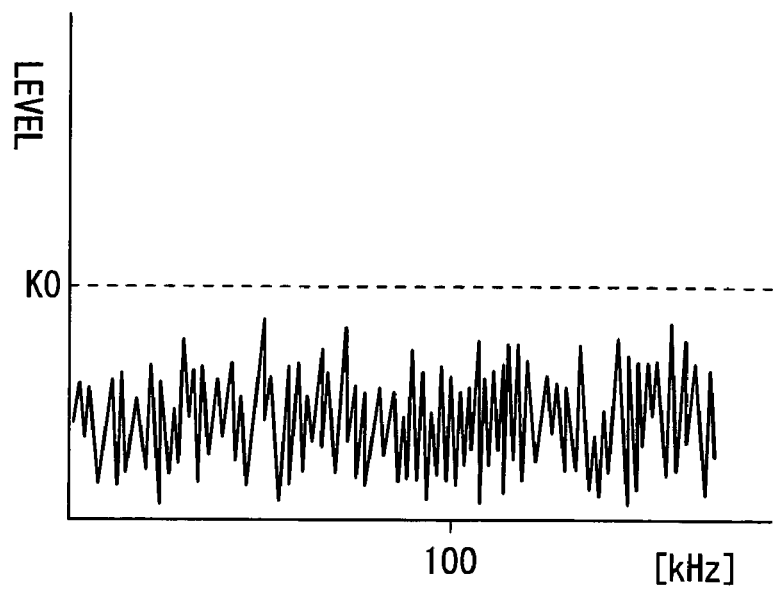
FIG. 7 shows the AC component of the signal provided from the S meter if no IBOC station exists as an adjacent station, and no adjacent interference is generated.
Figure 8:
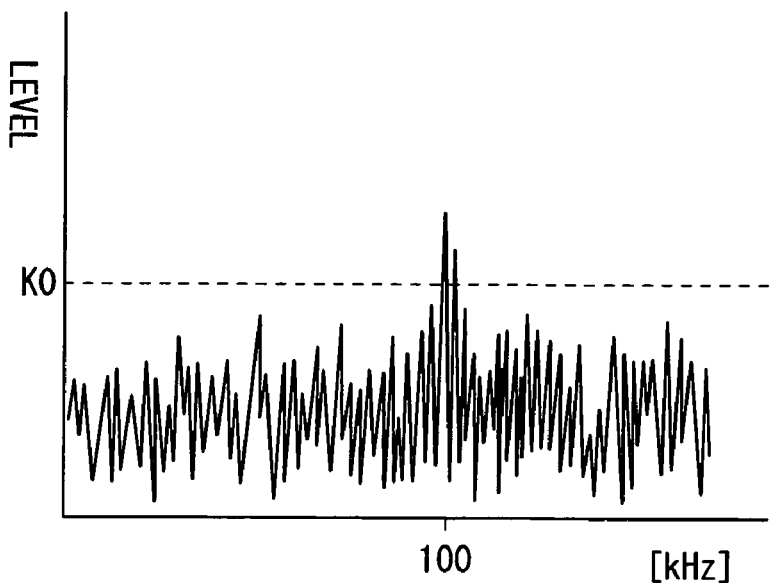
FIG. 8 shows the AC component of the signal provided from the S meter if no IBOC station exists as an adjacent station, and adjacent interference is generated.

FIG. 7 shows the AC component of the signal produced by the S meter 12 if no IBOC station exists as an adjacent station, and no adjacent interference is generated. FIG. 8 shows the AC component of the signal produced by the S meter 12 if no IBOC station exists as an adjacent station, and adjacent interference is generated.

If no IBOC station exists as an adjacent station, the control unit 70 transmits an instruction to the peak determination circuit 332 in the adjacent interference detection circuit 33 through the bus IF unit 34, and sets a threshold K0 used for detecting adjacent interference. Subsequently, the peak determination circuit 332 detects a peak value of a beat component in a neighborhood of 100 kHz in the output signal of the S meter 12 extracted by the band pass filter 330, and if the peak value exceeds the threshold K0 as FIG. 8 shows, the peak determination circuit 332 produces detection data indicating that adjacent interference noise is generated. The detection data are transmitted to the control unit 70 through the bus IF unit 34.

If the control unit 70 receives the detection data indicating the generation of adjacent interference from the adjacent interference detection circuit 33, the control unit 70 transmits an instruction for narrowing the pass band of the band pass filter (BPF) 22 through the bus IF 34. Subsequently, the pass band of the band pass filter 22 narrows, and thus, it is possible to reduce the adjacent interference noise generated if there exists an adjacent station having the carrier frequency separated by 100 kHz from the receive frequency.

(2) Operation if an IBOC Station Exists as an Adjacent Station

A description will now be given of an operation if the control unit 70 sets a predetermined receive frequency, and there exists an IBOC station which transmits a broadcast signal having a carrier frequency higher or lower than the receive frequency by 200 kHz.

(2-1) Control of Input/Output Characteristics

If there exists an adjacent station which transmits a broadcast signal having a carrier frequency separated from the receive frequency by 200 kHz, and simultaneously, this adjacent station is an IBOC station, the digital broadcast signals contained in the side-bands of the band of the broadcast signal of the IBOC station are mixed with the receive frequency band, the overall noise floor of the broadcast signal to be received increases, and the relationships among the input/output characteristics shown in FIG. 4 no longer hold.

Figure 9:
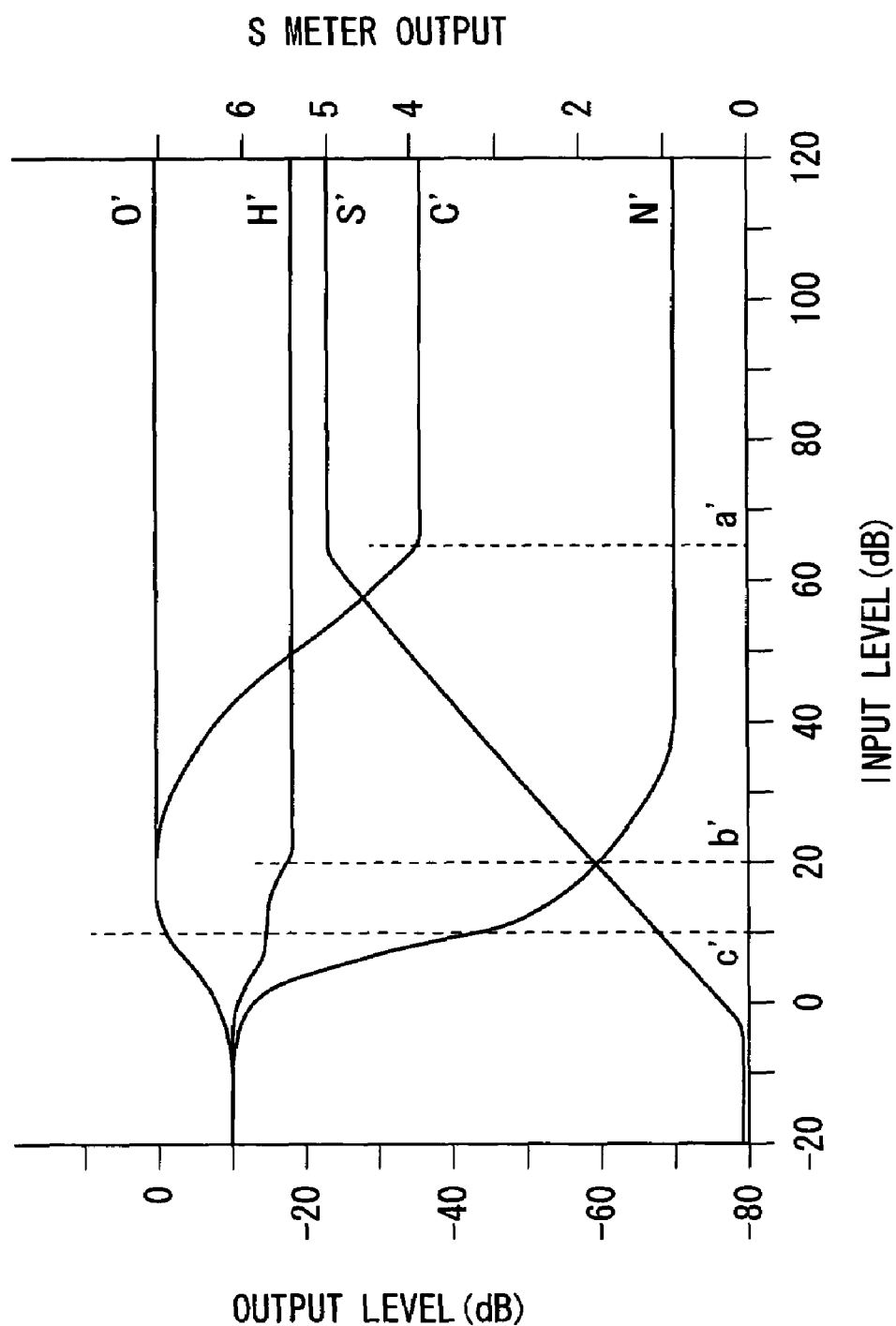
FIG. 9 shows states of the input/output characteristics if an IBOC station exists as an adjacent station.

FIG. 9 shows states of the input/output characteristics if an IBOC station exists as an adjacent station. As comparison of FIG. 9 to FIG. 4 clearly shows that if there exists an IBOC station as an adjacent station, not only the level of a convergence point of the noise characteristic indicated by the characteristic N (the left end of the characteristic N') changes, but also the output audio signal characteristic (characteristic O'), the channel separation characteristic (characteristic C'), and the high-cut characteristic (characteristic H') respectively change with respect to the receive electric field strength, and hence the input/output characteristics cannot be properly controlled even if the reference values "a", "b", and "c" shown in FIG. 4 are used. Therefore, in the present invention, the input/output characteristics are controlled using newly prepared reference values a', b', and c' for the input/output characteristics shown in FIG. 9.

Specifically, the control unit 70 detects the receive electric field strength of the broadcast signal based on the voltage level of the S meter signal, and if the receive electric field strength is equal to or greater than the reference value a', the control unit 70 transmits an instruction to the separation control circuit 250 in the stereo demodulation circuit 25 through the bus IF unit 34 so that the channel separation characteristic is a constant value indicated by the characteristic C'.

If the receive electric field strength is less than the reference value a', the control unit 70 decreases the channel separation characteristic at a predetermined rate indicated by the characteristic C'.

If the receive electric field strength is less than the reference value b', the control unit 70 transmits an instruction to the high-cut circuit 252 in the stereo demodulation circuit 25 to carry out a setting such that the high frequency component of the audio signal is gradually removed so that a relationship indicated by the characteristic H' is satisfied.

Further, if the receive electric filed strength is less than the reference value c', the control unit 70 transmits an instruction to the soft mute circuit 26 through the bus IF unit 34 to carry out soft mute processing which gradually decreases the output level so that the relationship indicated by the characteristic O' is satisfied.

(2-2) Control of Multi-path Characteristics

If there exists an IBOC station as an adjacent station, beat components of various frequencies contained in the AC component of the signal produced by the S meter 12 increase, and thus the component in the neighborhood of 114 kHz extracted for detecting multi-path interference is hidden by these beat components.

Figure 10:
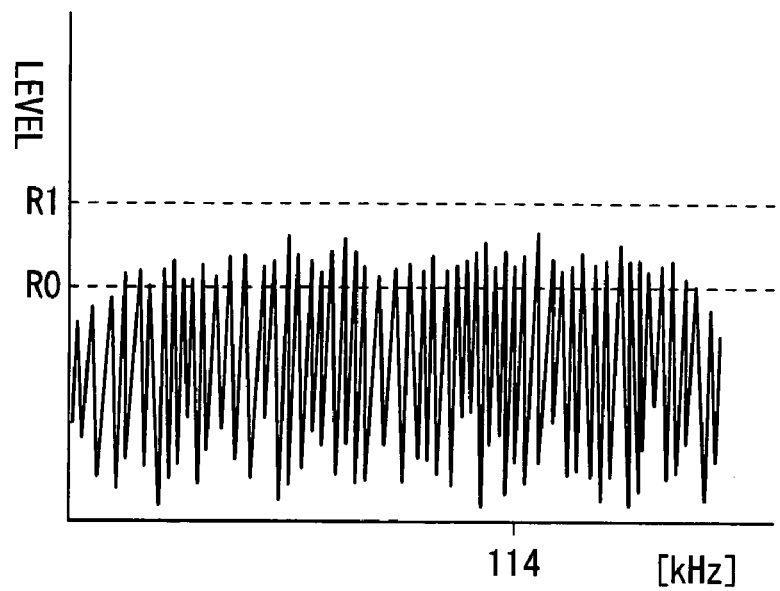
FIG. 10 shows the AC component of the signal provided from the S meter if an IBOC station exists as an adjacent station, and no multi-path interference is generated.
Figure 11:
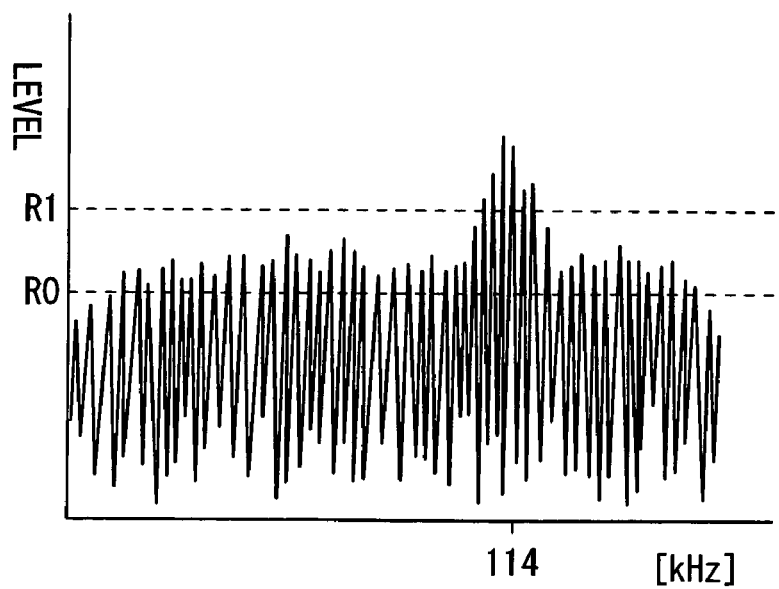
FIG. 11 shows the AC component of the signal provided from the S meter if an IBOC station exists as an adjacent station, and multi-path interference is generated.

FIG. 10 shows the AC component of the signal produced by the S meter 12 when an IBOC station exists as an adjacent station, and no multi-path interference is generated. FIG. 11 shows the AC component of the signal produced by the S meter 12 when an IBOC station exists as an adjacent station, and multi-path interference is generated.

As FIG. 10 shows, if there exists an IBOC station as an adjacent station, the level of the AC component of the signal received from the S meter 12 increases in a wide range containing 114 kHz used for detecting the multi-path interference, and exceeds the threshold R0 used for detecting multi-path interference if no IBOC station exists as an adjacent station. Therefore, if an IBOC station exists as an adjacent station, the control unit 70 transmits an instruction to the peak determination circuit 322 in the multi-path detection circuit 32 through the bus IF unit 34, and changes the threshold used for detecting multi-path interference to R1 which is larger than R0. This threshold R1 is set higher than a peak value of the component in the neighborhood of 114 kHz in the output signal of the S meter 12 in the case where an IBOC station exists as an adjacent station, and simultaneously multi-path interference is not generated, and thus, the multi-path detection circuit 32 can precisely detect that multi-path interference is not generated.

On the other hand as FIG. 11 shows, if multi-path interference is generated, the peak value of the component in the neighborhood of 114 kH increases further, and exceeds the threshold R1, and thus, the multi-path detection circuit 32 produces detection data indicating that the multi-path interference is generated. The detection data are transmitted to the control unit 70 through the bus IF unit 34.

If the control unit 70 receives the detection data indicating the generation of multi-path interference transmitted from the multi-path detection circuit 32, the control unit 70 transmits an instruction for changing the stereo reproduction operation to the monaural reproduction operation to the separation control circuit 250 in the stereo demodulation circuit 25 through the bus IF unit 34. Subsequently, the stereo demodulation circuit 25 carries out the monaural reproduction processing so as to reduce the multi-path interference noise.

(2-3) Control of Adjacent Interference Characteristic

If there exists an IBOC station as an adjacent station, the beat components of the various frequencies contained in the AC component of the signal produced by the S meter 12 increase, and thus the component in the neighborhood of 100 kHz extracted for detecting adjacent interference is hidden by these beat components.

Figure 12:
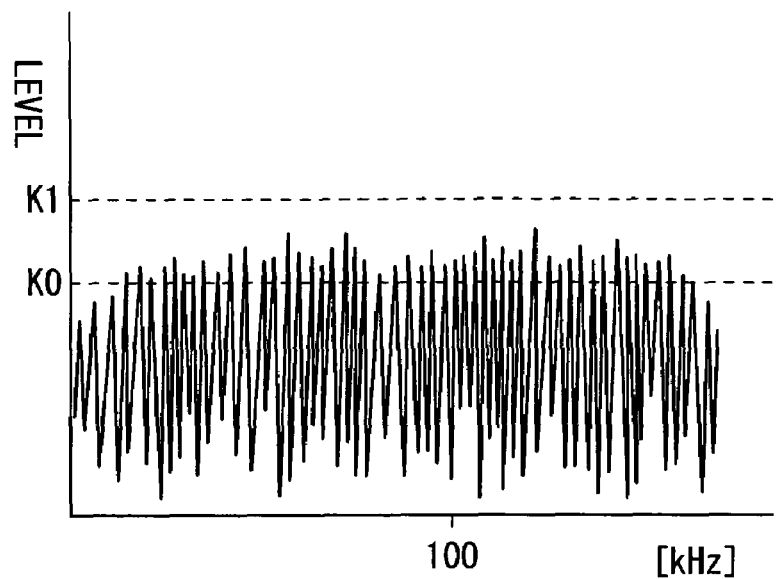
FIG. 12 shows the AC component of the signal provided from the S meter if an IBOC station exists as an adjacent station, and no adjacent interference is generated.
Figure 13:
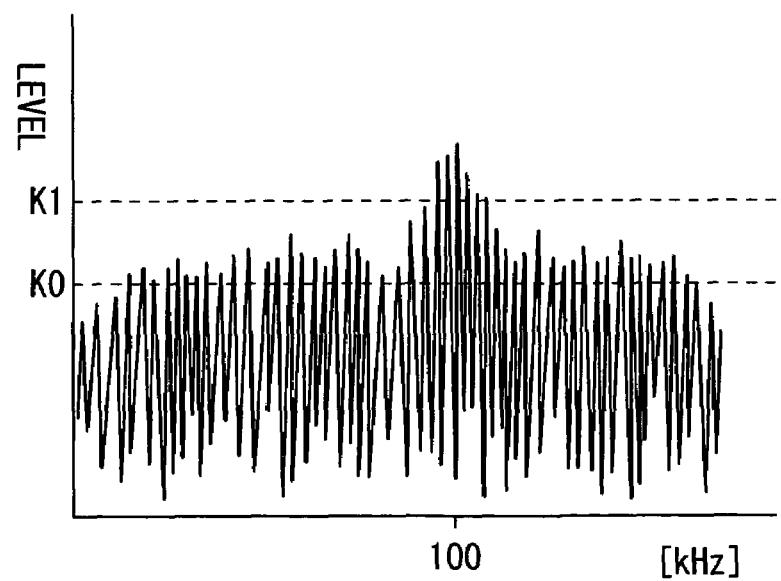
FIG. 13 shows the AC component of the signal provided from the S meter if an IBOC station exists as an adjacent station, and adjacent interference is generated.

FIG. 12 shows the AC component of the signal produced by the S meter 12 if an IBOC station exists as an adjacent station, and no adjacent interference is generated. FIG. 13 shows the AC component of the signal produced by the S meter 12 if an IBOC station exists as an adjacent station, and adjacent interference is generated.

As FIG. 12 shows, if there exists an IBOC station as an adjacent station, the level of the AC component of the signal produced by the S meter 12 increases in a wide range containing 100 kHz used for detecting adjacent interference, and exceeds the threshold K0 used for detecting adjacent interference if no IBOC station exists as an adjacent station. Therefore, if an IBOC station exists as an adjacent station, the control unit 70 transmits an instruction to the peak determination circuit 332 in the adjacent interference detection circuit 33 through the bus IF unit 34, and changes the threshold used for detecting multi-path interference to K1 which is larger than K0. This threshold K1 is set higher than a peak value of the component in the neighborhood of 100 kHz in the output signal of the S meter 12 in the case where an IBOC station exists as an adjacent station, and simultaneously adjacent interference is not generated, and thus, the adjacent interference detection circuit 33 can precisely detect that adjacent interference is not generated.

On the other hand as FIG. 13 shows, if adjacent interference is generated, the peak value of the component in the neighborhood of 100 kH increases further, and exceeds the threshold K1, and thus, the adjacent interference detection circuit 33 produces detection data indicating that the adjacent interference is generated. The detection data are transmitted to the control unit 70 through the bus IF unit 34.

If the control unit 70 receives the detection data indicating the generation of the adjacent interference from the adjacent interference detection circuit 33, the control unit 70 transmits the instruction of narrowing the pass band to the band pass filter 22 through the bus IF 34. Subsequently, the pass band of the band pass filter 22 narrows, and thus, it is possible to reduce the adjacent interference noise generated if there exists an adjacent station having the carrier frequency separated by 100 kHz from the receive frequency.

In this way, if the radio receiver according to the present embodiment detects the existence of an adjacent station using the adjacent station detection circuit 31, the operation state relating to the reception processing is set by the control unit 70, the different operation states can be set according to the existence of an adjacent station, and a proper operation state can be realized regardless of the existence of an adjacent station.

In addition, the S meter 12 is provided for detecting the receive electric field strength as the receive state of the broadcast signal to be received, and thus a proper operation state can be realized according to the receive state of the broadcast signal, especially the receive electric field strength, while considering the existence of an adjacent station.

In addition, an adjacent station to which the operation state is variably set is considered as an IBOC station which transmits a broadcast signal whose one channel includes an analog FM broadcast signal and digital broadcast signals, and thus, even if the entire noise floor increases due to the digital broadcast signal, a proper operation state can be always realized.

When an analog FM broadcast signal is received, and the contents of the signal are reproduced, since the operation state is variably set according to the existence of an adjacent IBOC station, and thus, even if the overall noise floor of the analog FM broadcast signal contained in the broadcast signal to be received increases due to a digital broadcast signal of an adjacent IBOC station, a proper operation state can be realized.

The adjacent station detection circuit 31 includes a band pass filter 310 which extracts the beat component due to the digital broadcast signal of an IBOC station as an adjacent station contained in the AC component produced by the S meter 12, and the peak determination circuit 312 which determines the existence of an adjacent IBOC station based on the level detection of the frequency component having passed the band pass filter 310, and consequently, it is possible to selectively extract only an IBOC station which transmits a broadcast signal in a channel containing digital broadcast signals in addition to an analog FM broadcast signal.

The radio receiver according to the present embodiment is provided with the adjacent multi-path detection circuit 32 for detecting the generation of multi-path interference, and the control unit 70 variably sets the threshold used by the multi-path detection circuit 32 for determining generation of multi-path interference based on the existence of an IBOC station as an adjacent station. Consequently, it is possible to properly detect multi-path interference regardless of the existence of an IBOC station even if the capability of detecting multi-path interference changes according to the existence of an IBOC station.

The radio receiver according to the present embodiment is provided with the interference detection circuit 33 for detecting the generation of adjacent interference, and the control unit 70 variably sets the threshold used by the adjacent interference detection circuit 33 for determining the generation of adjacent interference based on the existence of an IBOC station as an adjacent station. Consequently, it is possible to maintain the capability of detecting adjacent interference even if an IBOC station exists, and thus to properly detect adjacent interference regardless of the existence of an adjacent station.

The present invention is not limited to the above-described embodiment, and various modifications are possible within the scope of the present invention. Though the description is given of the radio receiver receiving the analog FM broadcast signal, and the digital broadcast signal corresponding to the analog FM broadcast signal in the above-described embodiment, the present invention can be applied to a case where an analog AM broadcast signal and a digital broadcast signal corresponding to the analog AM broadcast signal are received.

In the above-described embodiment, though the description is given of the radio receiver provided with the digital broadcast decoder 40 in addition to the analog broadcast decoder 20, the present invention may be applied to a radio receiver which is provided with the analog broadcast decoder 20, and carries out the reproduction operation only for the analog FM broadcast signal.

As described above, according to the present invention, it is possible to detect the generation of multi-path interference regardless of the existence of an adjacent station, and simultaneously to realize a proper operation state. Particularly, it is possible to realize a proper operation state according to the receive state of the broadcast signal, especially the receive electric filed strength, while considering the existence of an adjacent station.

What is claimed is:

1. A radio receiver comprising:
an adjacent station detection unit for detecting the existence of an adjacent station transmitting a broadcast signal at a frequency adjacent to a predetermined receive frequency;
a broadcast signal reception unit for receiving a broadcast signal at the receive frequency and reproducing a content of the broadcast signal;
a receive state detection unit for detecting a receive state of a broadcast signal to be received;
an operation state setting unit for setting an operation state of said broadcast signal reception unit based on the receive state detected by said receive state detection unit and the detection result by said adjacent station detection unit, wherein said operation state is an input/output characteristic comprising one or more of a channel separation characteristic, a blend characteristic, a high-cut characteristic, and a soft mute characteristic, and the set operation state when an adjacent station is detected is different than the set operation state when no adjacent station is detected, and wherein the receive state detected by said receive state detection unit is a receive electric field strength of the broadcast signal.

2. The radio receiver according to claim 1 wherein:
said adjacent station includes a first adjacent station transmitting a broadcast signal whose one channel contains a first carrier signal corresponding to an analog broadcast signal, and a second carrier signal corresponding to a digital broadcast signal including the same broadcast content as that of the analog broadcast signal, and a second adjacent station transmitting a broadcast signal whose one channel contains only said first carrier signal, and said adjacent station detection unit detects the existence of said first adjacent station.

3. The radio receiver according to claim 2 wherein said broadcast signal reception unit uses said analog broadcast signal to carry out a reproduction operation of the content of said analog broadcast signal.

4. The radio receiver according to claim 3 wherein said second carder signal is arranged in a side-band of said first carrier signal.

5. The radio receiver according to claim 4 wherein:

said broadcast signal reception unit includes a tuner unit for converting a broadcast signal to be received to an intermediate frequency signal, and said adjacent station detection unit includes a first filter for extracting a beat component of said second carrier signal contained in said intermediate frequency signal, and a first determination unit for determining the existence of said first adjacent station by carrying out level detection of a frequency component having passed said first filter.

6. The radio receiver according to claim 5 wherein:

said broadcast signal reception unit includes a stereo demodulation circuit carrying out stereo demodulation processing after detection of a broadcast signal corresponding to analog FM modulation, and said operation state selling unit sets a channel separation characteristic in the stereo demodulation processing in said stereo demodulation circuit based on the receive state detected by said receive state detection unit.

7. The radio receiver according to claim 5 wherein:

said broadcast signal reception unit includes a stereo demodulation circuit carrying out stereo demodulation processing after detection of a broadcast signal corresponding to analog FM modulation, and said operation state selling unit sets a blend characteristic in the stereo demodulation processing in said stereo demodulation circuit based on the receive state detected by said receive state detection unit.

8. The radio receiver according to claim 5 wherein:

said broadcast signal reception unit includes a stereo demodulation circuit carrying out stereo demodulation processing after detection of a broadcast signal corresponding to analog FM modulation, and said operation state selling unit sets a high-cut characteristic of removing a high frequency component in the stereo demodulation processing in said stereo demodulation circuit based on the receive state detected by said receive state detection unit.

9. The radio receiver according to claim 5 wherein:

said broadcast signal reception unit includes a mute circuit which attenuates an output level after detection of a broadcast signal corresponding to analog modulation, and said operation state selling unit sets the attenuation quantity of the output level in said mute circuit based on the receive state detected by said receive state detection unit.

10. The radio receiver according to claim 4 further comprising an adjacent interference detection circuit for detecting the generation of adjacent interference at a receive frequency, wherein said operation state setting unit variably sets a threshold used for determining the generation of the adjacent interference based on the detection result by said adjacent station detection unit.

11. A radio receiver comprising:

an adjacent station detection unit for detecting the existence of an adjacent station transmitting a broadcast signal at a frequency adjacent to a predetermined receive frequency, wherein said adjacent station includes a first adjacent station transmitting a broadcast signal whose one channel contains a first carrier signal corresponding to an analog broadcast signal and a second carrier signal corresponding to a digital broadcast signal including the same broadcast content as that of the analog broadcast signal and arranged in a side-band of said first carrier signal, and a second adjacent station transmitting a broadcast signal whose one channel contains only said first carrier signal, and said adjacent station detection unit detects the existence of said first adjacent station;

a receive state detection unit for detecting a receive state of a broadcast signal to be received, wherein the receive state is a receive electric field strength of the broadcast signal;

a broadcast signal reception unit for receiving a broadcast signal at the receive frequency and reproducing a content of the broadcast signal wherein said broadcast signal reception unit uses said analog broadcast signal to carry out a reproduction operation of the content of said analog broadcast signal;

an operation state setting unit for selling an operation state of said broadcast signal reception unit based on the detection result by said adjacent station detection unit and the receive state detected by said receive state detection unit; and a multi-path detection circuit for detecting the generation of multi-path interference at a receive frequency, wherein said operation state setting unit variably sets a threshold used for determining the generation of the multi-path interference based on the detection result by said adjacent station detection unit.

12. The radio receiver according to claim 11 wherein:

said broadcast signal reception unit includes a tuner unit for converting a broadcast signal to be received to an intermediate frequency signal, said multi-path detection circuit includes a second filter for extracting a specific frequency component which is contained in said intermediate frequency signal and increases when multi-path interference is generated, and a second determination unit for determining the generation of the multi-path interference by carrying out level detection of the specific frequency component having passed said second filter, and said operation state setting unit variably sets the threshold used for the determination by said second determination unit based on the detection result by said adjacent station detection unit.

13. The radio receiver according to claim 12 wherein:

said broadcast signal reception unit includes a stereo demodulation circuit carrying out stereo demodulation processing after detection of a broadcast signal corresponding to analog FM modulation, and said operation state setting unit sets said stereo demodulation circuit to carry out monaural reproduction when said multi-path detection circuit detects the generation of multi-path interference.

14. The radio receiver according to claim 11 wherein:

said broadcast signal reception unit includes a stereo demodulation circuit carrying out stereo demodulation processing after detection of a broadcast signal corresponding to analog FM modulation, and said operation state setting unit sets a channel separation characteristic in the stereo demodulation processing in said stereo demodulation circuit based on the receive state detected by said receive state detection unit.

15. The radio receiver according to claim 11 wherein:

said broadcast signal reception unit includes a stereo demodulation circuit carrying out stereo demodulation processing after detection of a broadcast signal corresponding to analog FM modulation, and said operation state selling unit sets a blend characteristic in the stereo demodulation processing in said stereo demodulation circuit based on the receive state detected by said receive state detection unit.

16. The radio receiver according to claim 11 wherein:

said broadcast signal reception unit includes a stereo demodulation circuit carrying out stereo demodulation processing after detection of a broadcast signal corresponding to analog FM modulation, and said operation state setting unit sets a high-cut characteristic for removing a high frequency component in the stereo demodulation processing in said stereo demodulation circuit based on the receive state detected by said receive state detection unit.

17. A radio receiver comprising:

an adjacent station detection unit for detecting the existence of an adjacent station transmitting a broadcast signal at a frequency adjacent to a predetermined receive frequency, wherein said adjacent station includes a first adjacent station transmitting a broadcast signal whose one channel contains a first carrier signal corresponding to an analog broadcast signal and a second carrier signal corresponding to a digital broadcast signal including the same broadcast content as that of the analog broadcast signal and arranged in a sideband of said first carrier signal, and a second adjacent station transmitting a broadcast signal whose one channel contains only said first carrier signal, and said adjacent station detection unit detects the existence of said first adjacent station;

a receive state detection unit for detecting a receive state of a broadcast signal to be received, wherein the receive state is a receive electric field strength of the broadcast signal;

a broadcast signal reception unit for receiving a broadcast signal at the receive frequency and reproducing a content of the broadcast signal wherein said broadcast signal reception unit uses said analog broadcast signal to carry out a reproduction operation of the content of said analog broadcast signal;

an operation state setting unit for setting an operation state of said broadcast signal reception unit based on the detection result by said adjacent station detection unit and the receive state detected by said receive state detection unit; and an adjacent interference detection circuit for detecting the generation of adjacent interference at a receive frequency;

wherein said broadcast signal reception unit includes a tuner unit for converting a broadcast signal to be received to an intermediate frequency signal, said adjacent interference detection circuit includes a third filter for extracting a beat component at a specific frequency which is contained in said intermediate frequency signal and increases when the adjacent interference is generated, and a third determination unit for determining the generation of the adjacent interference by carrying out level detection of the beat component at the specific frequency having passed said third filter, and said operation state setting unit variably sets a threshold used for the determination by said third determination unit based on the detection result by said adjacent station detection unit.

18. The radio receiver according to claim 17 wherein:

said broadcast signal reception unit includes a band pass filter which passes only a predetermined band component of the intermediate frequency signal output from said tuner unit, and said operation state setting unit narrows the band of said band pass filter when said adjacent interference detection circuit detects generation of the adjacent interference.

* * * * *